US005264934A

United States Patent [19]

Nakagawa

[11] Patent Number: 5,264,934

[45] Date of Patent: Nov. 23, 1993

[54] APPARATUS FOR ADJUSTING BRIGHTNESS OF A DISPLAY SCREEN BASED ON A DETECTED HORIZONTAL SYNC FREQUENCY

[75] Inventor: Tomohiro Nakagawa, Nagasaki, Japan

[73] Assignee: Mitsubishi Denki Kabushiki Kaisha, Tokyo, Japan

[21] Appl. No.: 892,033

[22] Filed: Jun. 2, 1992

[30] Foreign Application Priority Data

Oct. 2, 1991 [JP] Japan ................................ 3-280293

[51] Int. Cl.$^5$ ................................ H04N 5/57

[52] U.S. Cl. ................................ 358/168; 358/242

[58] Field of Search ................................ 358/168, 242, 169

[56] References Cited

U.S. PATENT DOCUMENTS 4,197,557 4/1980 Tuma ................................ 358/168
4,684,987 8/1987 Tsutsui ................................ 358/168
4,982,287 1/1991 Lagoni ................................ 358/168
4,991,023 2/1991 Nicols ................................ 358/168

FOREIGN PATENT DOCUMENTS 57-65071 4/1982 Japan .
57-119568 7/1982 Japan .
0099475 5/1986 Japan .
63-214791 9/1988 Japan .

*Primary Examiner*—James J. Groody
*Assistant Examiner*—Chris Grant
*Attorney, Agent, or Firm*—Burns, Doane, Swecker & Mathis

[57] ABSTRACT

A brightness control circuit used in a display apparatus which displays video signals of various horizontal sync frequencies comprises a horizontal frequency detector which detects the horizontal sync frequency of the input video signal and produces a value that is proportional to the detected frequency, a frequency-to-voltage convertor which produces a voltage that is proportional to the value of frequency, and a brightness adjustor which produces a brightness control signal such that the brightness of screen decreases in response to a smaller voltage value provided by the frequency-to-voltage convertor or increases in response to a larger voltage value.

6 Claims, 2 Drawing Sheets

APPARATUS FOR ADJUSTING BRIGHTNESS OF A DISPLAY SCREEN BASED ON A DETECTED HORIZONTAL SYNC FREQUENCY

BACKGROUND OF THE INVENTION

1. Field of the Invention

The present invention relates to a brightness control circuit used in display apparatus for adjusting the brightness of display screen.

2. Description of the Prior Art

FIG. 1 is a block diagram showing a conventional brightness control circuit. In the figure, symbol 1 denotes a variable resistor which produces a brightness control voltage from a constant voltage V by being operated by the user for setting the intended brightness of a display screen. Indicated by 2 is a pre-amplifier which amplifies the original video signal in accordance with the brightness control voltage provided by the variable resistor 1. A main amplifier 3 has a constant amplification factor for amplifying the primarily amplified video signal from the pre-amplifier 2. A cathode ray tube (CRT) 4 displays the secondarily amplified video signal produced by the main amplifier 3.

Next, the operation of this prior art arrangement will be explained. The variable resistor 1 connected to a voltage source of constant voltage V divides the voltage depending on the position of its sliding electrode to produce a brightness control voltage. The brightness control voltage produced by the variable resistor 1 is fed to the brightness control voltage input terminal of the pre-amplifier 2. The pre-amplifier 2 amplifies the received original video signal at an amplification factor (several-fold) determined by the brightness control voltage, and delivers the resulting primarily-amplified video signal to the main amplifier 3.

The main amplifier 3 amplifies the received primarily-amplified video signal at the prescribed amplification factor, and delivers the resulting secondarily-amplified video signal to the CRT 4. The CRT 4 displays the secondarily-amplified video signal, with the brightness of screen being determined by the amplitude of the secondarily-amplified video signal. The conventional brightness control circuit described above is disclosed in Japanese Patent Unexamined Publication No. 63-214791, for example.

According to the conventional brightness control circuit arranged as described above, a picture displayed on the CRT 4 has its brightness determined solely by the control voltage produced by the variable resistor 1. However, as the frequency of the horizontal sync signal rises, the line scanning time of an electron beam becomes shorter, causing the screen brightness to fall because of its dependency on the electron beam intensity and exposure time length. As a result, the brightness differs among input signals of different horizontal sync frequencies unless the voltage from the variable resistor 1 is adjusted. In other words, the user is obliged to adjust the setting of the variable resistor 1 each time the input horizontal sync frequency varies.

SUMMARY OF THE INVENTION

This invention is intended to overcome the foregoing prior art deficiency. One object of the invention is to provide a brightness control circuit capable of preventing the emergence of different brightness levels among input signals of different horizontal sync frequencies without compelling the user to constantly adjust the variable resistor.

The invention relates to a brightness control circuit which comprises means for detecting the frequency of the horizontal sync signal, means for converting the detected horizontal frequency into a voltage, and means for adjusting the reference value of the brightness control voltage produced by brightness setting means. The brightness adjustment means operates to vary the reference value for the brightness control voltage which is established in response to the voltage value derived from the frequency of the input horizontal sync signal, thereby preventing the screen brightness from differing among input signals of different horizontal sync frequencies.

DETAILED DESCRIPTION OF THE PREFERRED EMBODIMENTS

Figure 1:
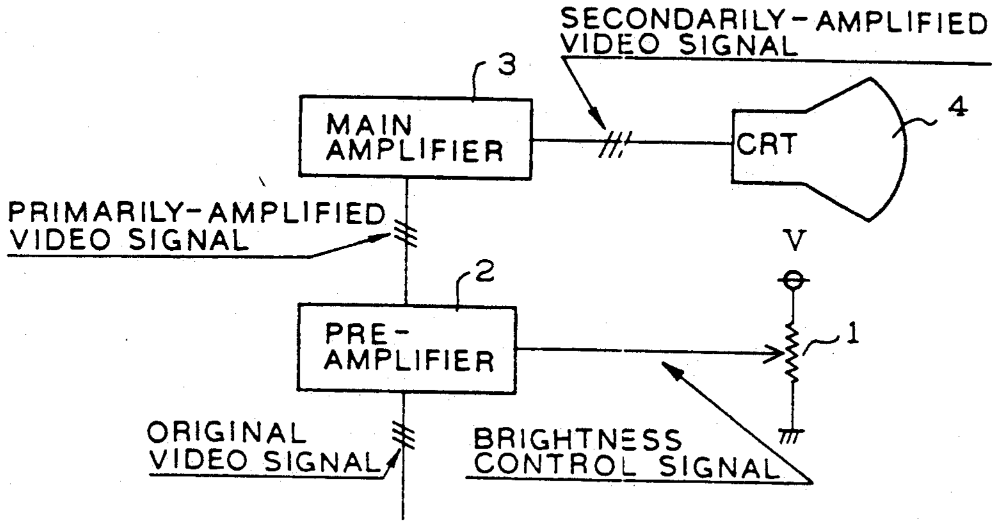
F I G. 1 (PRIOR ART)
FIG. 1 is a block diagram showing the conventional brightness control circuit.
Figure 2:
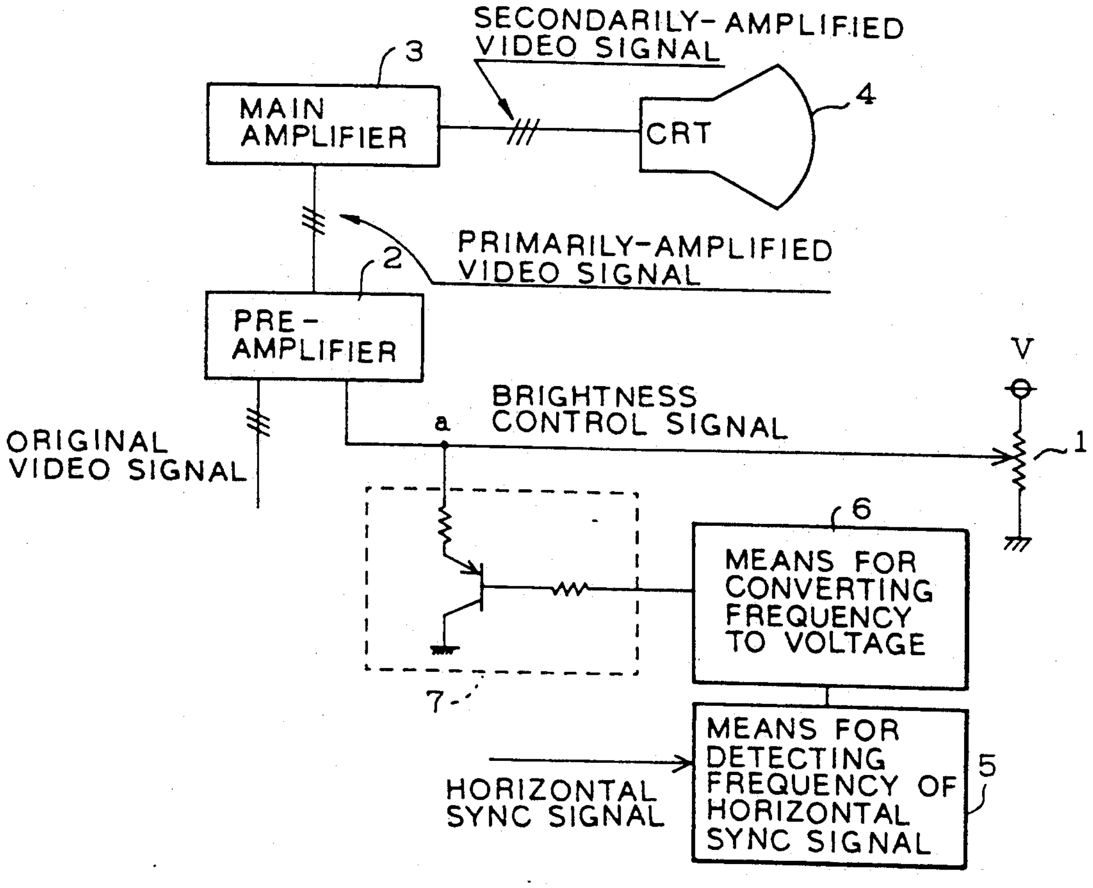
FIG. 2 is a block diagram showing the brightness control circuit based on a first embodiment of the present invention.

Embodiments of this invention will be described with reference to the drawings. In FIG. 2, symbol 1 denotes a variable resistor for setting the brightness of screen, 2 is a pre-amplifier, 3 is a main amplifier, and 4 is a CRT. These components are identical or equivalent to those of the conventional circuit arrangement referred to by the same symbols in FIG. 1, and detailed explanation thereof will not be repeated.

Indicated by 5 is a means for detecting the frequency of the input horizontal sync signal. A means for converting frequency to voltage 6 produces a voltage in proportion to the horizontal sync frequency detected by the means for detecting frequency 5. A transistor circuit 7 functions as a brightness adjustment means for reducing the reference value of the brightness control voltage, which is established on the variable resistor 1, in response to the voltage produced in proportion to the horizontal sync frequency by the means for converting frequency to voltage 6.

Next, the operation of the foregoing arrangement will be explained. The variable resistor 1 establishes a voltage which is the reference value for the brightness control voltage. The means for detecting frequency 5 detects the frequency of the input horizontal sync signal and delivers the result to the means for converting 6, which then produces a higher or lower voltage in proportion to the horizontal sync frequency detected by the means for detecting frequency 5.

The output voltage of the means for converting 6 is fed to the base of the transistor circuit 7, which has a smaller emitter current for a higher base voltage or a larger emitter current for a lower base voltage. Accordingly, when the horizontal sync frequency is high, the voltage at point a is close to the voltage which is produced inherently by the variable resistor 1, and the voltage decreases as the horizontal sync frequency falls. Accordingly, the voltage variation range at the a point made through the adjustment of the variable resistor 1 by the user is shifted to a higher frequency range as the horizontal sync frequency becomes higher. The pre-amplifier 2 bases its amplifying operation for the original video signal on the brightness control voltage at the a point. Therefore, the higher the horizontal sync frequency is, the more amplified the primarily-amplified video signal produced by the pre-amplifier 2.

The primarily-amplified video signal is fed intact to the main amplifier 3 and amplified at the prescribed amplification factor. The resulting secondarily-amplified video signal produced by the main amplifier 3 is delivered to the CRT 4 and displayed. As a result, the higher the horizontal sync frequency, the more amplified the video signal displayed on the CRT 4 becomes, and the reduction of brightness due to a rising horizontal sync frequency is prevented even though the reference voltage from the variable resistor 1 is fixed.

Although the foregoing embodiment is designed to produce a brightness control voltage by reducing the reference value set on the variable resistor 1 in response to the horizontal sync frequency, a variant design is to vary the supply voltage to the variable resistor 1 in response to the horizontal sync frequency. Another variant design is to use several variable resistors having different resistance ranges and select one of them in accordance with the horizontal sync frequency. Each variant design achieves the same effectiveness as the first embodiment.

Although the foregoing embodiment employs the means for detecting frequency 5 and the means for converting frequency to voltage 6 in a hardware configuration, their functions may be accomplished using software by means of a microcomputer, as will be explained next.

Figure 3:
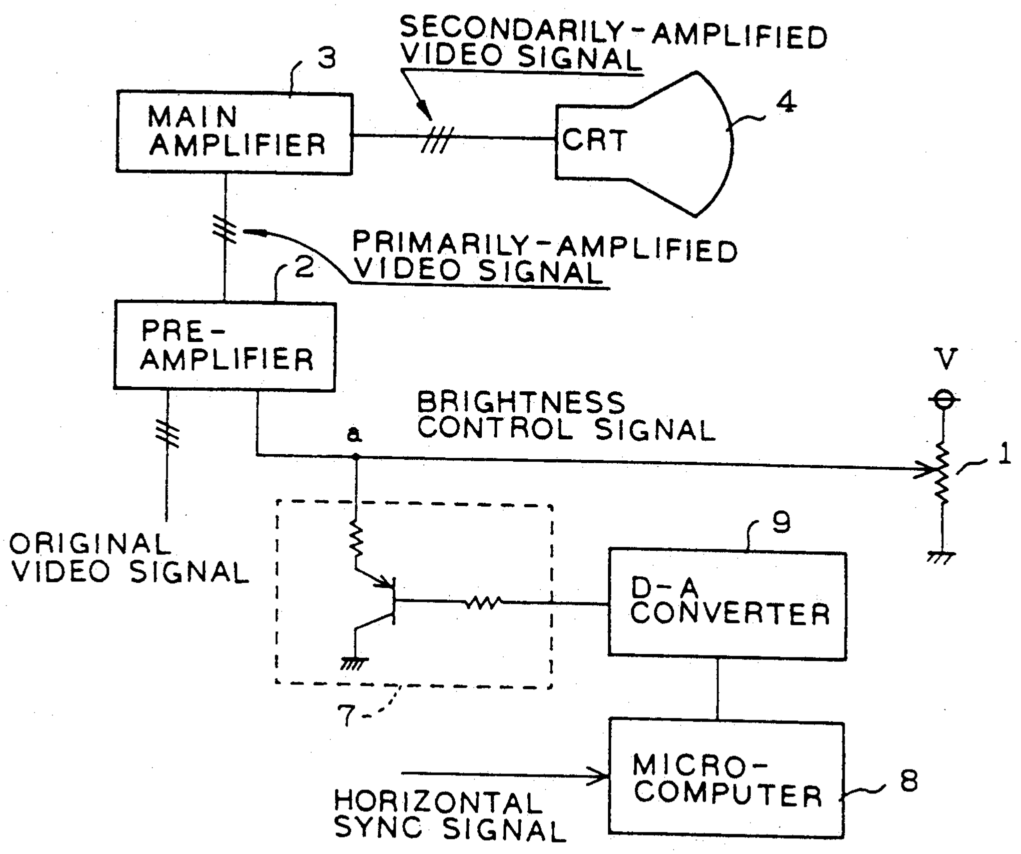
FIG. 3 is a block diagram showing the brightness control circuit based on a second embodiment of the present invention.

FIG. 3 is a block diagram showing the second embodiment of this invention, in which indicated by 8 is a microcomputer, 9 is a digital-to-analog (D-A) converter which converts a digital signal provided by the microcomputer 8 into an analog voltage signal to be fed to the transistor circuit 7.

Next, the operation of this embodiment will be explained. The microcomputer 8 measures the interval of adjacent horizontal sync pulses with its internal timer, and delivers a digital signal indicative of a voltage value which is in inverse proportion to the measured sync interval, i.e., it is proportional to the horizontal sync frequency. The digital voltage-value signal is fed to the D-A converter 9, by which it is converted into an analog signal to be fed to the base of the transistor circuit 7. The subsequent operation is identical to the first embodiment, and it works to prevent the screen brightness from varying depending on the input horizontal sync frequency.

A variant of the second embodiment is to accomplish the functions of the brightness setting means and brightness adjustment means by the microcomputer in addition to the horizontal sync frequency detection means and frequency-to-voltage conversion means, as will be explained next.

Figure 4:
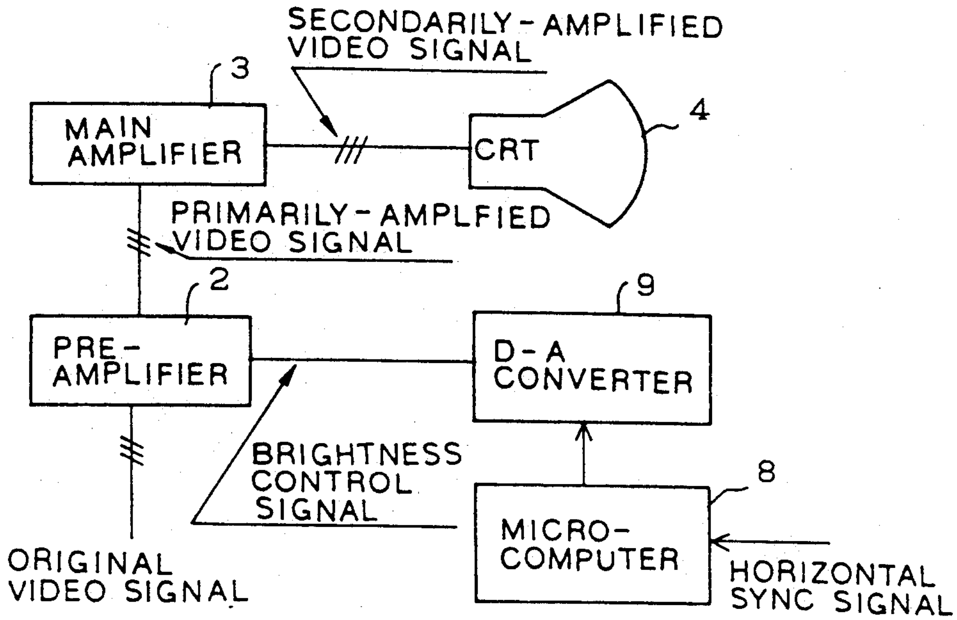
FIG. 4 is a block diagram showing the brightness control circuit based on a third embodiment of the present invention.

FIG. 4 shows the third embodiment of this invention. The microcomputer 8 provides a number of variation ranges of brightness control voltage responsive to several horizontal sync frequencies and delivers a digital signal of a value selected in the variation range for the input horizontal sync frequency. Values to be selected are set by means of a control switch not shown), for example. The D-A converter 9 converts the digital signal into an analog signal, and supplies the resulting brightness control voltage to the pre-amplifier 2.

Although the foregoing embodiments are designed to control the amplification factor of the pre-amplifier 2 in response to the horizontal sync frequency, variant designs may switch the amplification factor of the main amplifier 3 in response to the horizontal sync frequency, thereby achieving the same effectiveness as the foregoing embodiments.

According to the present invention, as described above, the brightness control voltage is produced based on the reference voltage which is varied in response to the input horizontal sync frequency so that the video signal is provided with a greater amplification factor for a higher horizontal sync frequency or a smaller amplification factor for a lower horizontal sync frequency. Consequently, a difference in screen brightness caused by different electron beam exposure time can be offset by a modified intensity of an electron beam. The inventive brightness control circuit maintains the effective brightness of the display screen at a virtually constant level for input signals of different horizontal sync frequencies.

What is claimed is:

1. A brightness control circuit comprising: brightness setting means for producing a reference value of a brightness control voltage which is used to set the brightness of pictures displayed on a display device; means for detecting frequency of a horizontal sync signal used in the display device; means for generating a voltage value based on the horizontal sync frequency detected by said means for detecting frequency; and brightness adjustment means for producing a higher brightness control voltage by adjusting the reference value, which is proved by said brightness setting means, in response to an increase in the voltage value provided by said voltage generating means, and for producing a lower brightness control voltage by adjusting the reference value in response to a decrease in the voltage value provided by said voltage generating means.

2. A display apparatus comprising: a display unit; brightness setting means for producing a reference value of a brightness control voltage which is used to set the brightness of pictures displayed on said display unit; means for detecting frequency of a horizontal sync signal used in said display unit; means for generating a voltage value based on the horizontal sync frequency detected by said means for detecting frequency; brightness adjustment means for producing a higher brightness control voltage by adjusting the reference value, which is provided by said brightness setting means, in response to an increase in the voltage value provided by said voltage generating means, and for producing a lower brightness control voltage by adjusting the reference value in response to a decrease in the voltage value provided by said voltage generating means; and amplifying means for amplifying a video signal in accordance with the brightness control voltage and delivering the amplified video signal to said display unit.

3. A brightness control circuit according to claim 1, wherein said voltage generating means produces a brightness control voltage such that said brightness adjustment means lowers the brightness of picture as the horizontal sync frequency falls.

4. A brightness control circuit according to claim 1, wherein said brightness setting means comprises a variable resistor which divides a given voltage and said brightness adjustment means comprises a circuit including a transistor which adjusts the voltage from said variable resistor in accordance with the voltage value provided by said voltage generating means.

5. A brightness control circuit according to claim 1, wherein said means for detecting frequency and said voltage generating means comprise a microcomputer which is adapted to measure the frequency of the input horizontal sync signal and produce a digital value, which represents a voltage value reflecting the measured horizontal sync frequency, to be used to adjust the reference value of the brightness control voltage.

6. A brightness control circuit according to claim 1, wherein said brightness adjustment means, said means for detecting frequency and said voltage generating means comprise a microcomputer which is adapted to measure the frequency of the input horizontal sync signal and delivers a voltage value in a voltage variation range corresponding to the measured horizontal sync frequency among voltage variation ranges prepared for various horizontal sync frequencies.

* * * * *